(12) United States Patent
Cohen et al.

(10) Patent No.: US 9,734,186 B1
(45) Date of Patent: Aug. 15, 2017

(54) METHOD OF TESTING COVERAGE OF META DATA ACCESS PATTERNS WITHIN A DISTRIBUTED RELATIONAL SYSTEM

(71) Applicant: EMC Corporation, Hopkinton, MA (US)

(72) Inventors: Jeffrey Ira Cohen, Sunnyvale, CA (US); Brian C. Hagenbuch, Annapolis, MD (US); Kurt Harriman, Novato, CA (US)

(73) Assignee: EMC IP Holding Co., LLC, Hopkinton, MA (US)

( * ) Notice: Subject to any disclaimer, the term of this patent is extended or adjusted under 35 U.S.C. 154(b) by 813 days.

(21) Appl. No.: 13/931,259

(22) Filed: Jun. 28, 2013

(51) Int. Cl.
*G06F 17/30* (2006.01)
(52) U.S. Cl.
CPC ............... *G06F 17/30371* (2013.01)
(58) Field of Classification Search
CPC .......... G06F 9/52; G06F 17/30348; G06F 17/30371; G06F 9/524; G06F 9/526
See application file for complete search history.

(56) References Cited

U.S. PATENT DOCUMENTS

| | | | |
|---|---|---|---|
| 2007/0101338 A1* | 5/2007 | Heddaya | G06F 9/524 718/104 |
| 2007/0203910 A1* | 8/2007 | Ferguson | G06F 17/30575 707/999.008 |
| 2009/0037416 A1* | 2/2009 | Raghavan | G06F 17/30362 |
| 2012/0222016 A1* | 8/2012 | Pastorelli | G06F 9/466 717/127 |

OTHER PUBLICATIONS

Gray et al., "Granularity of locks in a shared data base", In Proceedings of the 1st International Conference on Very Large Data Bases (VLDB '75), 1975, pp. 428-451.
Leslie Lamport,"Proving the Correctness of Multiprocess Programs", IEEE Transactions on Software Engineering SE-3, No. 2, Mar. 1977, pp. 125-143.

* cited by examiner

*Primary Examiner* — Dinku Gebresenbet
(74) *Attorney, Agent, or Firm* — Barry N. Young

(57) ABSTRACT

A first and a second catalog access statement are obtained. For the first catalog access statement, a first lock schedule which includes a catalog resource being locked and a lock strength is obtained. For the second catalog access statement, a second lock schedule which includes a catalog resource being locked and a lock strength are obtained. A potential deadlock between the first and the second catalog access statement is identified, including by comparing the first lock schedule and the second lock schedule.

24 Claims, 10 Drawing Sheets

METHOD OF TESTING COVERAGE OF META DATA ACCESS PATTERNS WITHIN A DISTRIBUTED RELATIONAL SYSTEM

BACKGROUND OF THE INVENTION

Catalogs are used to store metadata about user data (e.g., in a database) or other state or system information. To test catalog access statements, some systems have a run-time deadlock detector. For example, at run-time, it is determined if a catalog access statement which is about to be run has the potential to deadlock with an already-running or another soon to be run catalog access statement. If so, the later catalog access statement is aborted. New techniques which are capable of determining ahead of time (i.e., prior to run time) if two catalog access statements have the potential to deadlock would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
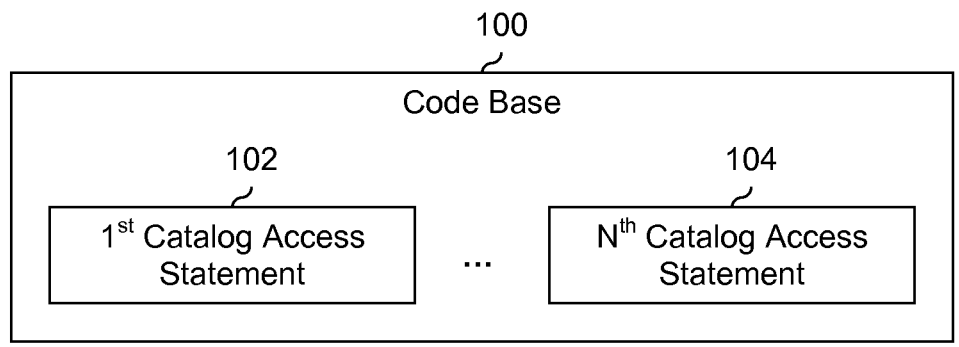
FIG. 1 is a diagram showing an embodiment of a deadlock testing module which detects potential deadlocks in catalog access statements.
Figure 1:
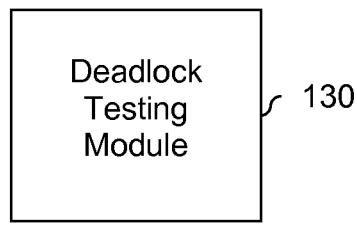
Figure 1:
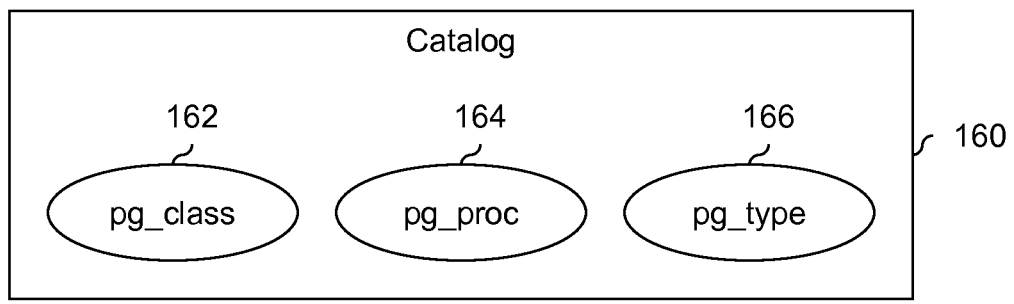

FIG. 1 is a diagram showing an embodiment of a deadlock testing module which detects potential deadlocks in catalog access statements. In this example, code base 100 includes N catalog access statements (including catalog access statements 102 and 104) which are tested and/or evaluated by deadlock testing module 130 for potential deadlocks. In some embodiments, code base 100 includes a developer code base that is only accessible to developers and which is not accessible to a customer or end user. For example, the system may be a Greenplum or Pivotal system and only Greenplum or Pivotal engineers have access to code base 100 which is tested by deadlock testing module 130. In some embodiments, code base 100 includes a customer code base, for example written by and/or accessible to a customer or end user that has installed a Greenplum or Pivotal system. In other words, in various embodiments, deadlock testing module 130 is used to test developer catalog access statements and/or customer catalog access statements.

In this example, catalog 160 includes pg_class 162, pg_proc 164, and pg_type 166. Catalog access statements (such as 102 and 104) are transformed into lock schedules which lock one or more catalog resources (such as pg_class 162, pg_proc 164, and pg_type 166) in the order prescribed by the lock schedule and using the lock strength (e.g., shared or exclusive) specified by the lock schedule. In this example, the catalog resource pg_class 162 stores information associated with tables, indices, or views, such as the name of a table/index/view, the namespace that includes a given table/index/view, etc. The catalog resource pg_proc 164 stores information about functions or procedures, such as the name of a function, the owner of a function, the data type of an output of a function, etc. The catalog resource pg_type 166 stores information about data types, such as the name of a data type, the namespace that contains the data type, the owner of the data type, etc. As the names imply, a shared lock may be shared by more than one entity (e.g., two catalog access statements or lock schedules are permitted to both have a shared lock on the same catalog resource), whereas an exclusive lock cannot be shared.

In some embodiments, code base 100 is associated with a next generation database system which includes a major redesign of the catalog architecture. For example, a previous generation of the system (not shown) may have its catalog resides within user data (the catalog and user data are co-located on the same device) and a next generation system may have an external catalog (i.e., where the catalog and user data are no longer co-located; not shown) or the catalog is a unified catalog service (UCS) supported catalog where a UCS interfaces to multiple catalogs of differing types (e.g., Hadoop, Greenplum, organized catalogs, unorganized catalogs, etc.). As part of the catalog re-architecture, code base 100 may be re-written and tested using deadlock testing module 130 to ensure that the rewritten catalog access statements have as few deadlocks as possible.

Deadlock testing module 130 analyzes catalog access statements based on lock schedules where each entry in a lock schedule includes a (e.g., single) catalog resource which is locked and a lock strength. The sequence or ordering of the lock schedule corresponds to the order in which locks are obtained. Using lock schedules enables deadlock testing module 130 to analyze all possible timing combinations and/or relationships between two catalog access statements, thus enabling a deadlock testing module to explore all (e.g., timing) possibilities for potential deadlocks. In contrast, a simulator would only expose a deadlock if two catalog access statements if a fairly narrow timing window is satisfied. Even if two catalog access statements which have the potential to deadlock are run concurrently by a simulator, if the timing is not right then the deadlock will not be triggered by the simulator. Typically, a simulator will not expose all deadlocks and/or the amount of simulation time required to expose a deadlock takes a relatively long time. In contrast, deadlock testing module 130 does not have long run times and more conclusively determines that two catalog access statements do not have the potential to deadlock.

Another benefit to deadlock testing module 130 is that it is not a run time event. Unlike some other systems which use a run time deadlock detector, deadlock testing module 130 is run ahead of time (e.g., when the catalog access statements being tested are not actually desired by the system). As such, deadlock testing module 130 does not interfere with system performance (e.g., because it does not introduce any delay prior to running catalog access statement 102 or 104), which is a desirable thing for high performance systems.

In various embodiments, deadlock testing module 130 resides on various devices. In some embodiments, deadlock testing module 130 is co-located with code base 100. In some embodiments, deadlock testing module 130 is on a master node. In some embodiments, the system is a distributed system and deadlock testing module 130 is distributed throughout the system.

Although this figure and other examples described herein show two catalog access statements or two lock schedules being compared, the techniques described herein are applicable to three or more catalog access statements or lock schedules. For example, a combination of three lock schedules may have a potential deadlock. However, if only two of the three exemplary lock schedules are running concurrently (i.e., without the third exemplary lock schedule), the system is not vulnerable to the potential deadlock because all three are required in order to cause that particular deadlock to occur.

Figure 2:
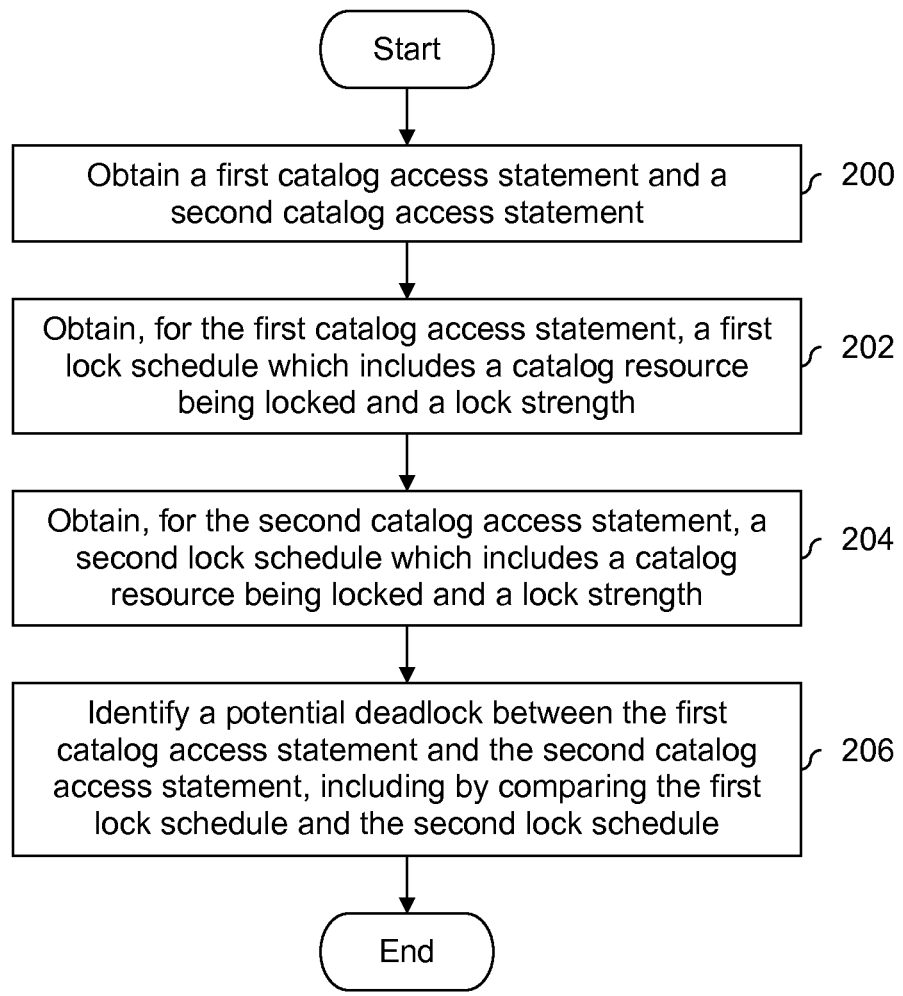
FIG. 2 is a flowchart illustrating an embodiment of a process for testing a pair of catalog access statements for deadlocks.

FIG. 2 is a flowchart illustrating an embodiment of a process for testing a pair of catalog access statements for deadlocks. In FIG. 1, deadlock testing module 130 may perform the example process. At 200, a first catalog access statement and a second catalog access statement are obtained. In some embodiments, catalog access statements obtained at 200 are written in a Catalog Access Language (CaQL). In some embodiments, catalog access statements obtained at 200 are written in Structured Query Language (SQL).

At 202, a first lock schedule which includes a catalog resource being locked and a lock strength is obtained for the first catalog access statement and at 204, a second lock schedule which includes a catalog resource being locked and a lock strength is obtained for the second catalog access statement. In some embodiments, specified catalog resources can either be put into a testing mode or a normal/operational mode. In the testing mode, locks are merely tracked but are not actually acquired. In the normal/operational mode, locks are actually acquired. In one example of putting catalog resources into a test mode, at compile time, a list of catalog resources to put into a test mode is passed to a makefile which controls or sets the locking behavior or mode. Putting some or all catalog resources into a test mode may be desirable since the system will not be put into an actual deadlock state should a deadlock be detected by a deadlock testing module.

Returning to FIG. 1, in some embodiments, a lock schedule for first catalog access statement 102 is obtained by putting all resources in catalog 160 (in that example, pg_class 162, pg_proc 164, and pg_type 166) into a test mode and "running" first catalog access statement 102 in order to obtain a lock schedule for that catalog access statement. The process may be repeated for Nth catalog access statement 104 to obtain a lock schedule for that catalog access statement.

Returning to FIG. 2, at 206, a potential deadlock between the first catalog access statement and the second catalog access statement is identified, including by comparing the first lock schedule and the second lock schedule. Some example lock schedules are described in further detail below. In some embodiments, in addition to flagging or identifying a potential deadlock, a user interface for a deadlock testing module presents a proposed fix to the potential deadlock. This may enable statements to be restructured in order to eliminate identified deadlocks, so that both can be run concurrently without errors or failures. Some example proposed fixes are described in further detail below.

Figure 3:
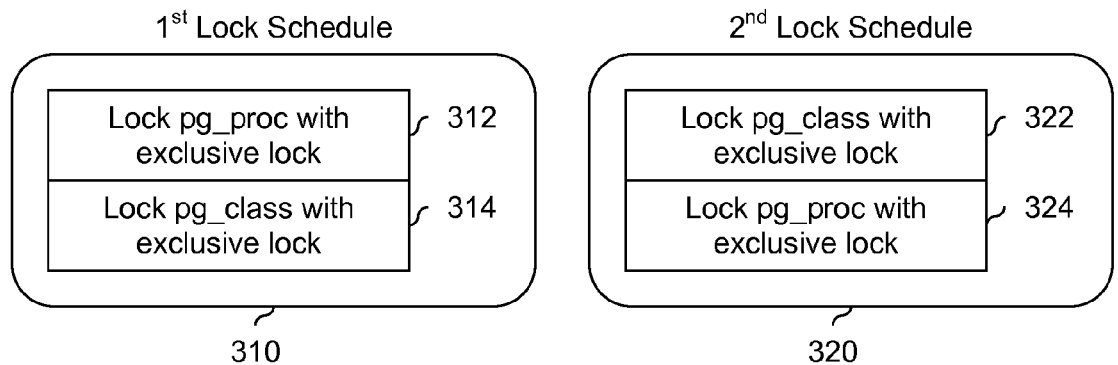
FIG. 3 is a diagram showing embodiments of a pair of lock schedules with a lock inversion type of deadlock and a pair of lock schedules with a lock escalation type of deadlock.
Figure 3:
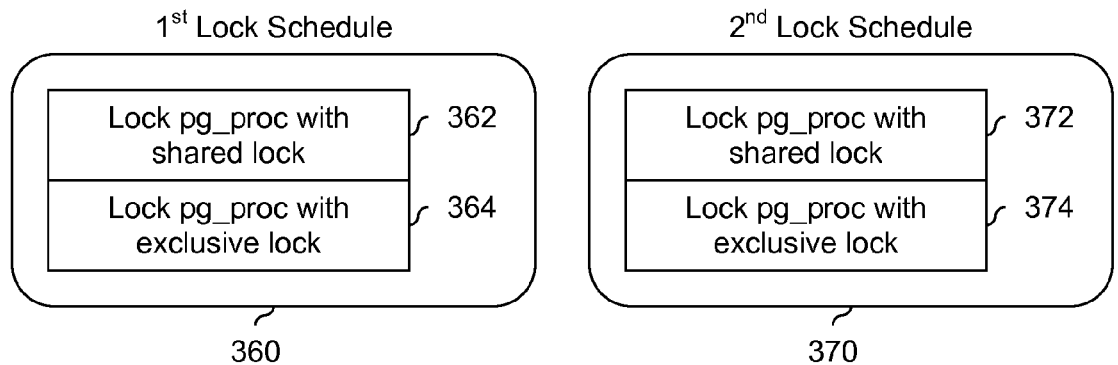

FIG. 3 is a diagram showing embodiments of a pair of lock schedules with a lock inversion type of deadlock and a pair of lock schedules with a lock escalation type of deadlock. In the example shown, diagram 300 shows a pair of lock schedules with an inversion type of deadlock. In first lock schedule 310, the first entry (312) obtains an exclusive lock on pg_proc and the second entry (314) obtains an exclusive lock on pg_class. In second lock schedule 320, the first entry (322) obtains an exclusive lock on pg_class and the second entry (324) obtains an exclusive lock on pg_proc.

In diagram 300, a lock inversion type of deadlock will occur if first entry 312 obtains an exclusive lock on pg_proc at roughly the same time that first entry 322 obtains an exclusive lock on pg_class. If so, second entry 314 would then be prohibited from an obtaining an exclusive lock on pg_class by entry 322 and second entry 324 would then be prohibited from obtaining an exclusive lock on pg_proc by entry 312. This is one example of how a lock inversion type of deadlock may occur and this would be identified as a potential lock inversion type of deadlock at 206 in FIG. 2.

Diagram 350 shows an example of a lock escalation type of deadlock. In this example, first lock schedule 360 has a first entry which obtains a shared lock on pg_proc (362) and has a second entry which obtains an exclusive lock on pg_proc (364). Second lock schedule 370 also has a first entry which obtains a shared lock on pg_proc (372) and has a second entry which obtains an exclusive lock on pg_proc (374).

A lock escalation type of deadlock occurs in diagram 350 if first entry 362 obtains a shared lock on pg_proc at roughly the same time that first entry 372 obtains a shared lock on pg_proc. Since both first entry 362 and 372 have a lock strength of "shared," one would not prohibit the other from obtaining its shared lock. However, if both have a shared lock on pg_proc, then both second entry 364 and second entry 374 would be prohibited from obtaining an exclusive lock on pg_proc and the system would be in a lock escalation type of deadlock. In FIG. 2, this potential deadlock would be flagged at step 206.

In some embodiments, what would otherwise be a potential deadlock is avoided or prevented because of the existence of a blocking lock which establishes a "critical section". A blocking lock, as used herein, is a lock which prevents two lock schedules from running currently (at least for the entries associated with the potential deadlock), thus preventing the deadlock from ever occurring (e.g., across all timing combinations). Since the deadlock is blocked from ever occurring by the blocking lock, it would not be identified at 206 in FIG. 2. The following figures show some examples of blocking locks.

Figure 4:
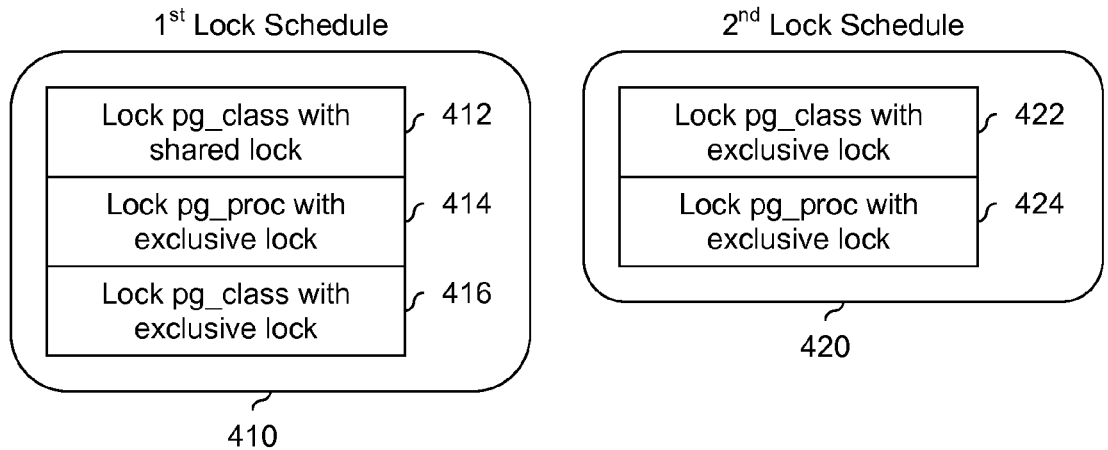
FIG. 4 is a diagram showing embodiments of blocking locks which prevent lock inversion types of deadlocks from ever occurring.
Figure 4:
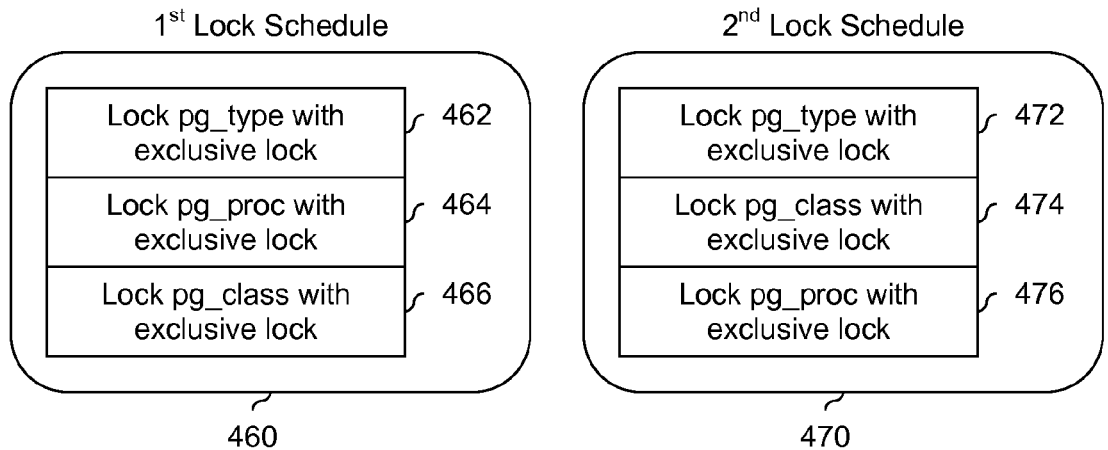

FIG. 4 is a diagram showing embodiments of blocking locks which prevent lock inversion types of deadlocks from ever occurring. In diagram 400, entry 414 matches entry 312 in FIG. 3, entry 416 matches entry 314 in FIG. 3, entry 422 matches entry 322 in FIG. 3, and entry 424 matches entry 324 in FIG. 3. In other words, the potential for a lock inversion type of deadlock exists in lock schedule 410 and lock schedule 420.

What prevents the lock inversion type of deadlock from ever occurring is the existence of a blocking lock associated with entry 412 and entry 422. Entry 412 is associated with obtaining a shared lock on pg_class and entry 422 is associated with obtaining an exclusive lock on pg_class. The two entries are mutually exclusive and prevents the other from occurring. For example, if entry 412 is performed before entry 422, then there will be a shared lock on pg_class which will prevent entry 422 from executing. Second lock schedule 420 then either waits from first lock schedule 410 to complete or immediately returns an error or null signal. If, on the other hand, entry 422 is performed before entry 412, then there will be an exclusive lock on pg_class which prevents entry 412 executing. In that case, first lock schedule 410 would either wait for second lock schedule 4120 to complete or returns an error or null signal. In either case (i.e., entry 412 is performed first or entry 422 is performed first), the lock inversion type of deadlock is prevented from ever occurring because of the blocking lock.

Diagram 450 shows another example of a blocking lock. In this example, entry 464 matches entry 312 in FIG. 3, entry 466 matches entry 314 in FIG. 3, entry 474 matches entry 322 in FIG. 3, and entry 476 matches entry 324 in FIG. 3. The blocking lock in this example is associated with entry 462 and entry 472. In this example, both entries 462 and 472 have lock strengths of "exclusive" and the catalog resource associated with the blocking lock (in this example, pg_type) is not one of the catalog resources associated with the lock inversion type of deadlock (in this example, pg_proc and pg_class).

In both diagram 400 and 450, the blocking lock has certain characteristics or properties which are sufficient but not necessary to create a blocking lock (i.e., there may be some other set of characteristics which are sufficient to create a blocking lock). More specifically, the first catalog resource in common to both lock schedules in diagram 400 and diagram 450 (e.g., when starting from the top of a lock schedule) has a lock strength of exclusive for at least one of the corresponding entries. In diagram 400, for example, the first catalog resource in common to both lock schedules is pg_class. The corresponding entries are entry 412 and entry 422. Of those two, entry 422 has a lock strength of exclusive so at least one of the entries has a lock strength of exclusive. Similarly, in diagram 450, the first catalog resource in common to lock schedules 460 and 470 is pg_type. In the corresponding entries (i.e., 462 and 472), both entries have lock strengths of exclusive so this is sufficient to create a blocking lock.

In general, so long as one of the blocking lock entries has a lock strength of exclusive and the entries associated with the blocking lock are before the entries associated with the deadlock in their respective lock schedules, there exists a blocking lock. A blocking lock does not necessarily have to be associated with a first catalog resource in common.

Figure 5:
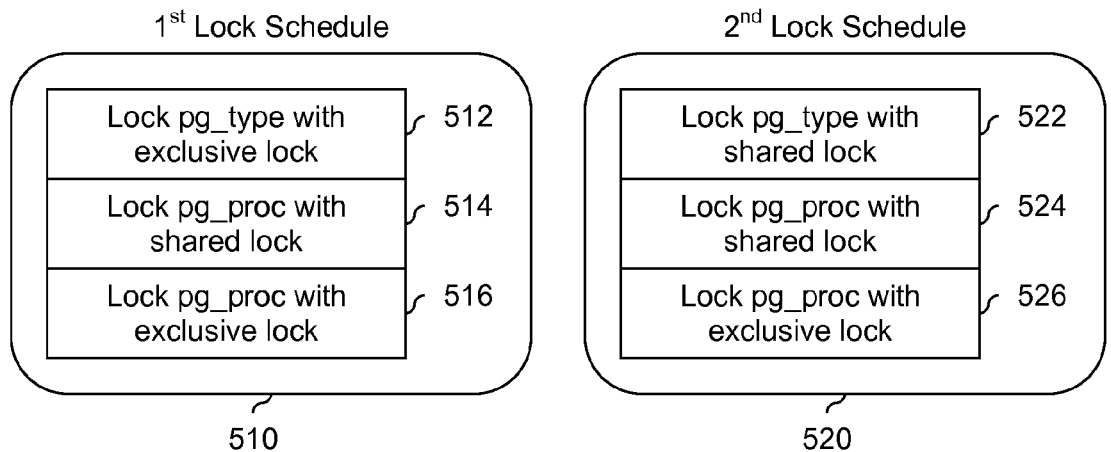
FIG. 5 is a diagram showing embodiments of blocking locks which prevent lock escalation types of deadlocks from ever occurring.
Figure 5:
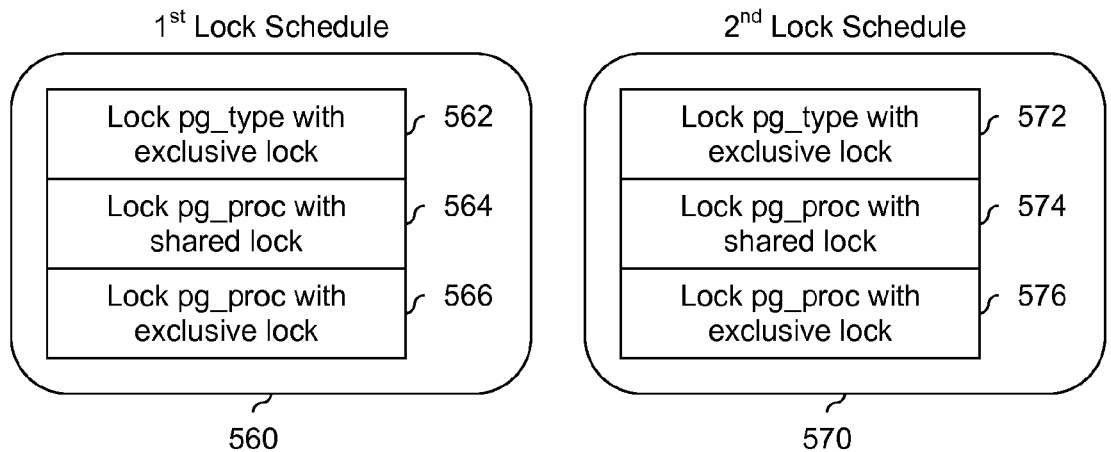

FIG. 5 is a diagram showing embodiments of blocking locks which prevent lock escalation types of deadlocks from ever occurring. In diagram 500, entry 514 matches entry 362 in FIG. 3, entry 516 matches entry 364 in FIG. 3, entry 524 matches entry 372 in FIG. 3, and entry 526 matches entry 374 in FIG. 3. A blocking lock associated with entries 512 and 522 prevents the lock escalation type of deadlock from ever occurring in diagram 500. If entry 512 is executed before entry 522, then the exclusive lock on pg_type prevents entry 522 from being performed and second lock schedule 520 waits for first lock schedule 510 to complete before starting, or an error or null is returned. If entry 522 is performed before entry 512, then the shared lock on pg_type prevents entry 512 from being performed and first lock schedule 510 waits for second lock schedule 520 to complete, or an error or null is returned.

In diagram 550, entries 562 and 572 are associated with a blocking lock. In that example, both of entries 562 and 572 have a lock strength of exclusive. As with the previous blocking lock examples, the blocking lock prevents first lock schedule 560 and second lock schedule 570 from running concurrently, especially during entries 566 and 576 which is where the lock escalation type of deadlock could occur.

The following figure describes an example process which takes into consideration blocking locks when identifying potential deadlocks. In some embodiments, the example process described below is performed in step 206 in FIG. 2.

Figure 6:
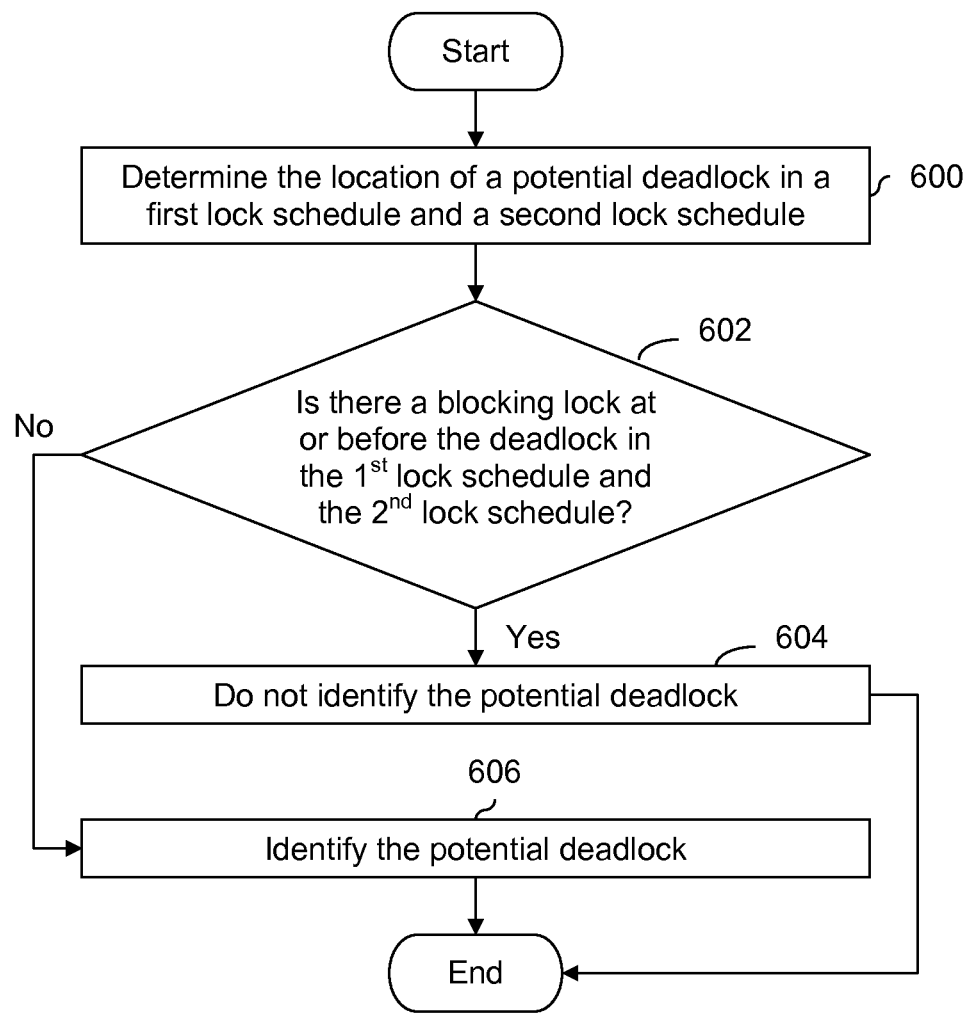
FIG. 6 is a flowchart illustrating an embodiment of a process for identifying a potential deadlock which takes blocking locks into consideration.

FIG. 6 is a flowchart illustrating an embodiment of a process for identifying a potential deadlock which takes blocking locks into consideration. In the example shown, a potential deadlock is not identified for flagged if a blocking lock exists in the first lock schedule and the second lock schedule which would prevent the potential deadlock from ever occurring.

At 600, the location of a potential deadlock in a first lock schedule and a second lock schedule is determined. For example, if entries in a lock schedule are assigned numbers, then in FIG. 5 the potential deadlock in diagram 500 has a location of 3 (516) in first lock schedule 510 and a location of 3 (526) in second lock schedule 520.

At 602, it is determined if there is a blocking lock at or before the deadlock in the first lock schedule and the second lock schedule. In some embodiments, this is done by first assembling the set of catalog resources in the first lock schedule before the location of deadlock and assembling the set of catalog resources in set first lock schedule before the location of the deadlock. For example, in diagram 500 in FIG. 5, for first lock schedule 510 the set includes pg_type (a location of 1) and pg_proc (a location of 2) and in second lock schedule 520 the set includes pg_type (a location of 1) and pg_proc (a location of 2). It is then determined if any of the catalog resources in the two sets overlap. In the example of diagram 500 in FIG. 5, pg_type overlap and pg_proc overlap (i.e., they are shared or are in common). It is then determined if any of the overlapping catalog resources have at least one exclusive lock. The overlapping catalog resource pg_proc does not (because both entry 514 and entry 524 have lock strengths of shared), but pg_type has one exclusive lock and one shared lock, so entry 512 and entry 522 associated with pg_type are sufficient to create a blocking lock and the location of the blocking lock occurs at or before the location of the deadlock.

If the decision at 602 is yes, then at 604 the potential deadlock is not identified. This is because there exists a blocking lock which prevents the potential deadlock from ever occurring. Some examples of this are shown in FIGS. 4 and 5. If the decision at 602 is no, then at 606 the potential deadlock is identified. This is because there is no blocking lock which always prevents the potential deadlock from occurring and in some cases the potential deadlock may occur.

Although the example of FIG. 6 identifies deadlocks first and then checks for blocking locks, in some embodiments the ordering is reversed. For example, a process may check for blocking locks first, and then check for (only in the locations at or prior to the blocking lock) a deadlock. This may be attractive in a well groomed system where the probability of any random pair of lock schedules having a blocking lock is relatively high and the location of such blocking locks tends to be first or early in the random pair of lock schedules. For example, suppose that all possible pairs of lock schedules in a system are guaranteed to have a blocking lock in the first entry or position because all lock schedules obtain an exclusive lock in the first entry on the same catalog resource. For such an extremely well groomed system, since the blocking lock occupies the first location or position, checking for a deadlock is relatively trivial. In contrast, when a collection of lock schedules contains dozens or even hundreds of entries, the number of possible interactions is quite large. Conceptually, two lock schedules can be thought of as a deck of playing cards, and the interleaving or serialization of the two schedules is like a shuffling of two stacks of cards. For lock schedules with M and N entries, the number of possible combinations is equivalent to the binomial coefficient C(M+N,M)=C(M+N, N). This demonstrates how much a first blocking lock or a relatively early blocking lock dramatically prunes the number of possible interleaving sequences.

The following figures show examples of processes for identifying lock inversion types of deadlocks and lock escalation types of deadlocks. In some embodiments, the following processes are performed at step 206 in FIG. 2. In some embodiments, the following processes are performed at 600 in FIG. 6 (e.g., in order to determine the location of a potential deadlock prior to any elimination as a result of a blocking lock).

Figure 7:
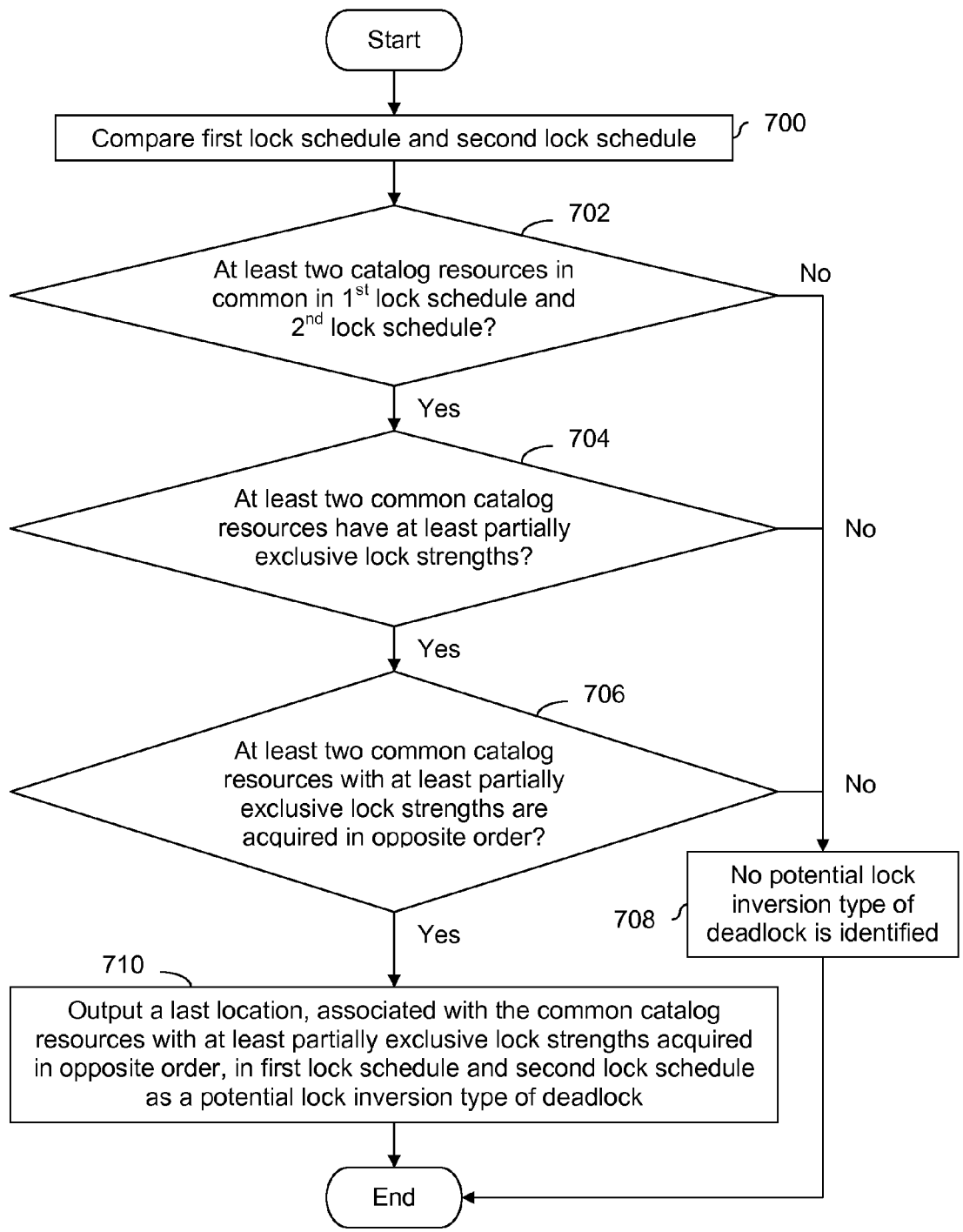
FIG. 7 is a flowchart illustrating an embodiment of a process for identifying a lock inversion type of deadlock.

FIG. 7 is a flowchart illustrating an embodiment of a process for identifying a lock inversion type of deadlock. At 700, a first lock schedule and a second lock schedule are compared. At 702, it is determined if there are at least two catalog resources in common in the first lock schedule and the second lock schedule. In diagram 400 in FIG. 4, for example, the catalog resource pg_class is in both first lock schedule 410 and second lock schedule 420 and the catalog resource pg_proc is also in both first lock schedule 410 and second lock schedule 420. In that example there are two catalog resources in common to the first and second lock schedules so the decision at 702 is yes.

If the decision at 702 is yes, then at 704 it is determined if at least two of the common catalog resources have at least partially exclusive lock strengths. What is meant by at least partially exclusive lock strengths is that for a given catalog resource in common, at least one of the lock strengths in the first lock schedule or the second lock schedule is exclusive. In diagram 400 in FIG. 4, for example, pg_class is locked with an exclusive lock by both entry 416 and entry 422 and pg_proc is locked with an exclusive lock by both entry 414 and entry 424. In that example, the decision at 704 is yes. Note that the number of catalog resources at 702 do not need to match the number of catalog resources at 704. For example, it may be determined at 702 that there are three catalog resources in common and at 704 it is determined that only two of those catalog resources in common have at least partially exclusive lock strengths.

If the decision at 704 is yes, then at 706 it is determined if at least two of the common catalog resources with at least partially exclusive lock strengths are acquired in opposite order. In second lock schedule 420 in FIG. 4, for example, the two catalog resources in common are acquired in the order: pg_class and pg_proc. Although in first lock schedule 410 the catalog resources are acquired in the order: pg_class, pg_proc, and pg_class, because another process handles checking for blocking locks, the ordering of second entry 414 and third entry 416 is sufficient to satisfy the inverse or opposite order check at 706 and the decision at 706 (in this example at least) is yes.

If the decision at 706 is yes, then at 710 a last location, associated with the common catalog resources with at least partially exclusive lock strengths acquired in opposite order, in the first lock schedule and the second lock schedule are output as a potential lock inversion type of deadlock. In the example of diagram 400 in FIG. 4, a location of 3 (corresponding to entry 416) would be output for first lock schedule 410 and a location of 2 (corresponding to entry 424) would be output for second lock schedule 420.

If the decisions at 702, 704, or 706 is no, then at 708 no potential lock inversion type of deadlock is identified.

Figure 8:
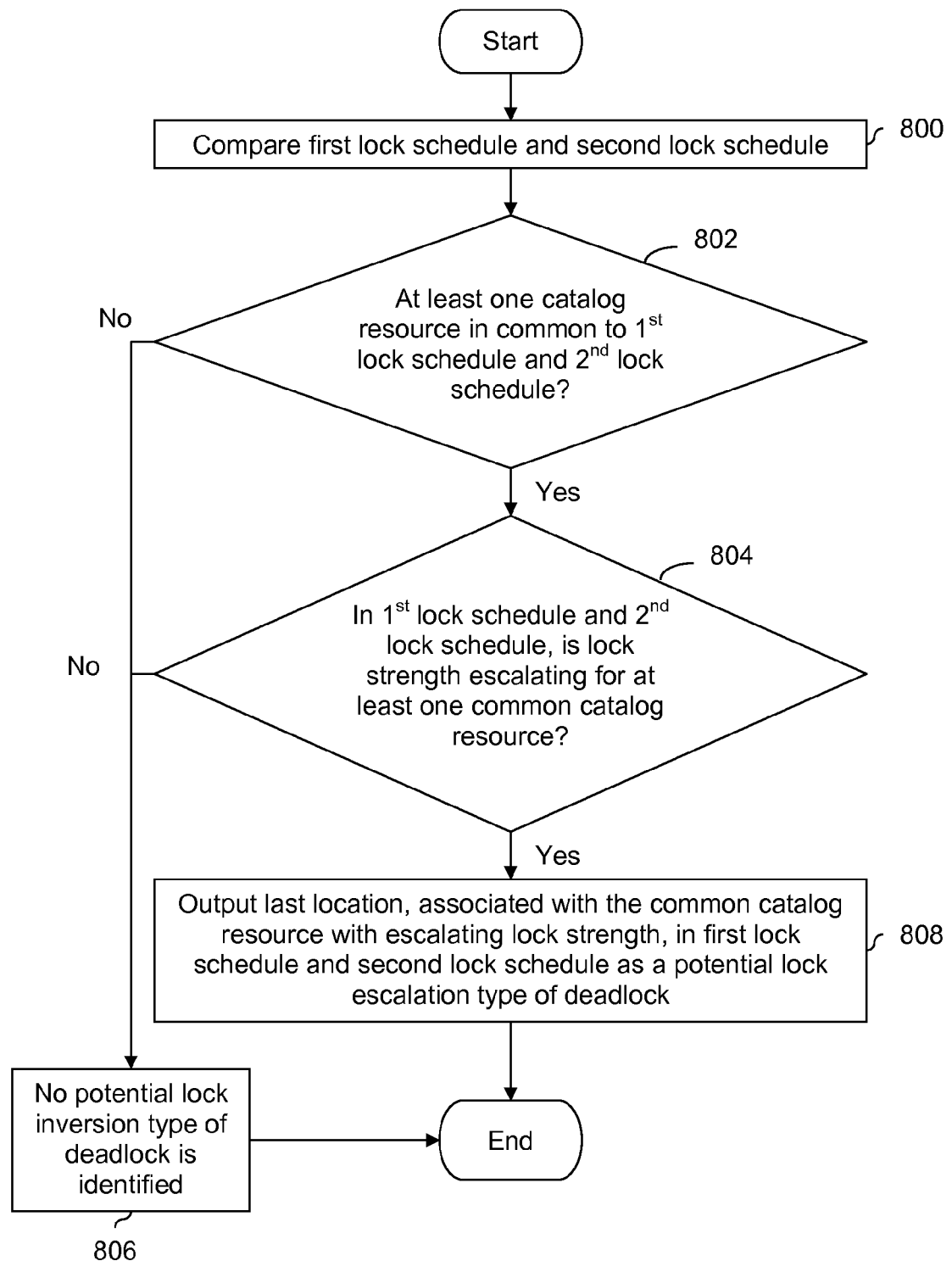
FIG. 8 is a flowchart illustrating an embodiment of a process for identifying lock inversion types of deadlocks.

FIG. 8 is a flowchart illustrating an embodiment of a process for identifying lock inversion types of deadlocks. At 800, a first lock schedule and a second lock schedule are compared. At 802, it is determined if there is at least one catalog resource in common to the first lock schedule and the second lock schedule. In diagram 500 in FIG. 5, for example, first lock schedule 510 and second lock schedule 520 both have catalog resource pg_type and pg_proc in common so the decision at 802 for this example is yes.

At 804, it is determined if, in the first lock schedule and the second lock schedule, a lock strength is escalating for at least one common catalog resource. Returning to diagram 500 in FIG. 5, the catalog resource pg_proc has escalating lock strengths (i.e., from shared to exclusive) in both first lock schedule 510 and second lock schedule 520 so the decision at 804 for this example is yes. Note that the number of catalog resources in common at 802 does not need to match the number of catalog resources with escalating lock strengths at 804. For example, there are may be two catalog resources in common at 802, but only one of them has escalating lock strengths in both the first and second lock schedules at 804.

If the decision at 804 is yes, then at 808 the last location, associated with the common catalog resource with escalating lock strength, in the first lock schedule and the second lock schedule are output as a potential lock escalation type of deadlock. In diagram 500 in FIG. 5, for example, a location of 3 (corresponding to entry 516) would be output for first lock schedule 510 and a location of 3 (corresponding to entry 526) would be output for second lock schedule 520. Note that as in the previous example, another (e.g., later) process handles checking for blocking locks, so the blocking locks at entry 512 and entry 522 in FIG. 5 will be detected by another process and the lock escalation type of deadlock identified here will not be flagged or identified by some overarching or higher level process.

If the decision at 802 or 804 is no, then at 806 no potential lock inversion type of deadlock is identified.

As described above, in some embodiments, after identifying a potential deadlock in FIG. 2, a subsequent process suggests (e.g., to a developer or end user) a fix to prevent the identified deadlock from ever occurring. The following figures show some examples for suggesting deadlock fixes.

Figure 9:
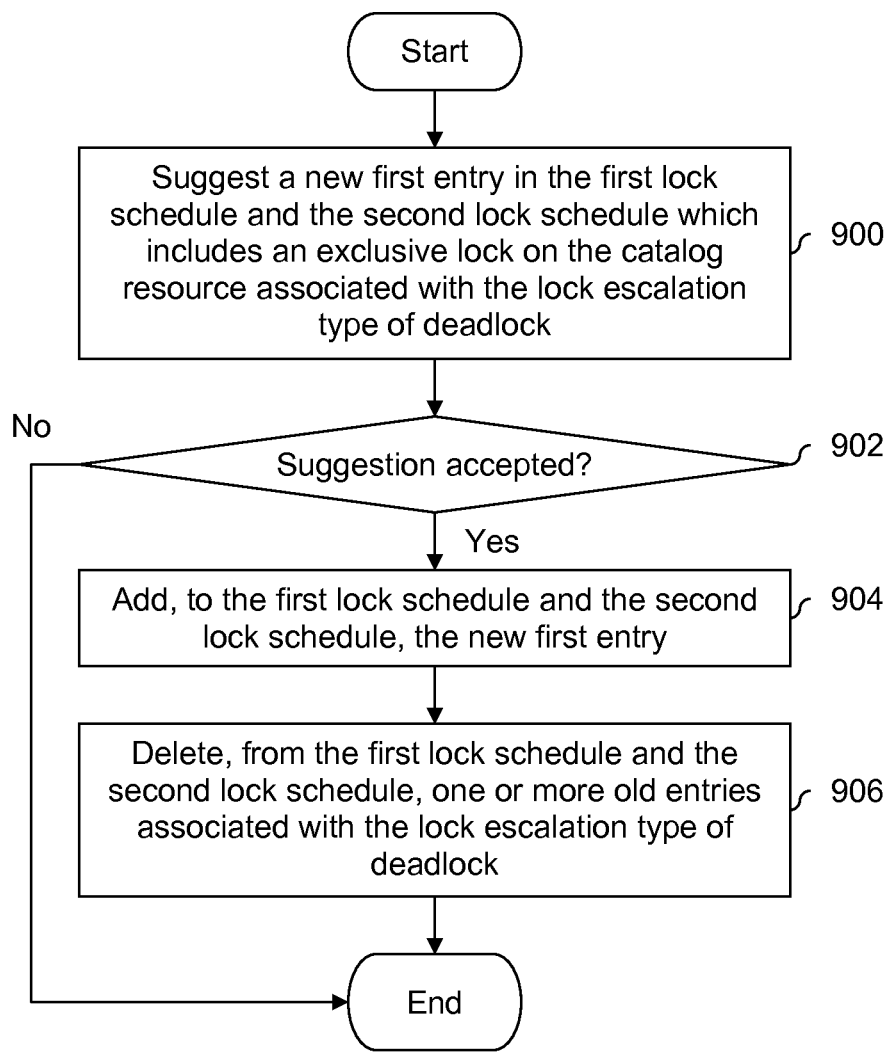
FIG. 9 is a flowchart illustrating an embodiment of a process for suggesting a fix to a lock escalation type of deadlock.

FIG. 9 is a flowchart illustrating an embodiment of a process for suggesting a fix to a lock escalation type of deadlock. At 900, a new first entry in the first lock schedule and the second lock schedule is suggested which includes an exclusive lock on the catalog resource associated with the lock escalation type of deadlock. For example, in a graphical user interface, the first lock schedule and the second lock schedule may be presented with the suggested new first entry in a different color, highlighted, italicized, and so on to indicate the proposed change.

At 902, it is determined if the suggestion is accepted. For example, a graphical user interface may have a variety of controls, buttons, and so on for a user to indicate whether the suggested change is accepted or declined. If the suggestion is accepted at 902, the new first entry is added to the first lock schedule and the second lock schedule at 904. The new first entry in the first lock schedule and the second lock schedule creates a blocking lock which also happens to be the first entry. Although any blocking lock which occurs before the entries associated with the deadlock would be sufficient to always prevent the deadlock from occurring, a blocking lock which is the first entry may be desirable because it maximally reduces the number of possible interleaving sequences. As described above, when lock schedules include dozens or even hundreds of entries, this may be very attractive.

At 906, one or more old entries associated with the lock escalation type of deadlock are deleted from the first lock schedule and the second lock schedule. With the new first entry, the old entries associated with the lock escalation type of deadlock are redundant and may be deleted from the first and second lock schedules.

Figure 10:
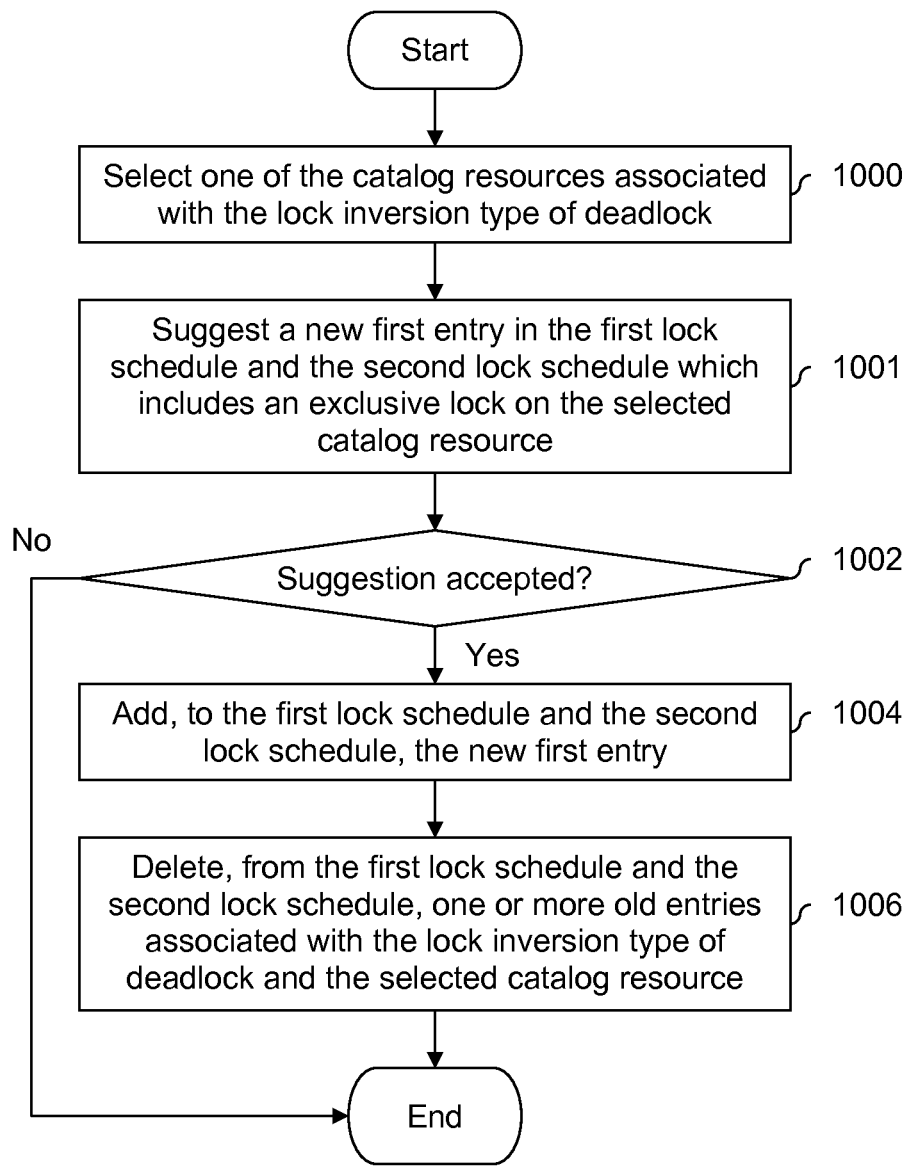
FIG. 10 is a flowchart illustrating an embodiment of a process for suggesting a fix to a lock inversion type of deadlock.

FIG. 10 is a flowchart illustrating an embodiment of a process for suggesting a fix to a lock inversion type of deadlock. As in the previous example, this example process suggests a blocking lock at the beginning of the relevant lock schedules so as to maximally reduce the number of possible interleaving sequences with the earliest possible blocking lock.

At 1000, one of the catalog resources associated with the lock inversion type of deadlock is selected. For example, in diagram 300 in FIG. 3, step 1001 selects either pg_class or pg_proc. At 1001, a new first entry in the first lock schedule and the second lock schedule is suggested which includes an exclusive lock on the selected catalog resource. For example, if pg_class is selected at 1000, then the suggested new first entry at 1001 includes an exclusive lock on pg_class.

At 1002, it is determined if the suggestion is accepted. As described above, a variety of user interfaces and user interface controls may be used at 1001 for presenting a suggestion and at 1002 for receiving instructions at 1002. If the suggestion is accepted at 1002, at 1004, the new first entry is added to the first lock schedule and the second lock schedule. At 1006, one or more old entries associated with the lock inversion type of deadlock and the selected catalog resource are deleted from the first lock schedule and the second lock schedule. Note that the new first entry only applies to one of the catalog resources involved in the lock inversion type of deadlock, so only the old entries associated with the selected catalog resource are made redundant; old entries associated with the unselected catalog resource are kept in the first and second lock schedules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of testing catalog access statements in a code base prior to run time to identify and avoid a potential deadlock, comprising:

obtaining from the code base prior to run time a first catalog access statement and a second catalog access statement;

obtaining from the code base prior to run time, for the first catalog access statement, a first lock schedule which indicates: (1) a first catalog resource that is locked by the first catalog access statement and (2) a lock strength used by the first catalog access statement to lock the first catalog resource;

obtaining from the code base prior to run time, for the second catalog access statement, a second lock schedule which indicates: (1) a second catalog resource that is locked by the second catalog access statement and (2) a lock strength used by the second catalog access statement to lock the second catalog resource;

said first and second lock schedules comprising respective first and second sequences of catalog access statement entries having locations in said sequences corresponding to the order in which said locks are obtained on the catalog resources;

using a processor to identify a potential deadlock between the first catalog access statement and the second catalog access statement by determining if the first and the second catalog resources in the first lock schedule and in the second lock schedule are the same type of catalog resource and if the lock strengths of their corresponding locks create a potential deadlock, and upon determining that there is a potential deadlock, avoiding the potential deadlock by creating a blocking lock at or before a location of the potential deadlock in the first and second lock schedules.

2. The method of claim 1, wherein said catalog resources comprise either a resource that stores information associated with a table, an index or a view, or a resource that stores information about functions or procedures, or a resource that stores information about a data type.

3. The method of claim 1, wherein the identified potential deadlock includes a lock inversion type of deadlock.

4. The method of claim 3, wherein using the processor to identify the potential deadlock includes:

comparing the first lock schedule and the second lock schedule;
determining if there are at least two catalog resources in common in the first lock schedule and in the second lock schedule;
determining if the at least two common catalog resources have at least partially exclusive lock strengths;
determining if the locks of the at least two common catalog resources with at least partially exclusive lock strengths are acquired in opposite order;
in the event it is determined there are at least two common catalog resources with at least partially exclusive lock strengths and locks acquired in opposite order, outputting a last location, associated with the common catalog resources with at least partially exclusive lock strengths acquired in opposite order, in the first lock schedule and in the second lock schedule as a potential lock inversion type of deadlock; and
in the event it is determined there is one or fewer common catalog resources with at least partially exclusive lock strengths acquired in opposite order, identifying no potential lock inversion type deadlock.

5. The method of claim 1, wherein the identified potential deadlock includes a lock escalation type of deadlock.

6. The method of claim 5, wherein using the processor to identify the potential deadlock includes:
comparing the first lock schedule and the second lock schedule;
determining if there is at least one catalog resource in common to the first lock schedule and the second lock schedule;
determining if, in the first lock schedule and in the second lock schedule, a lock strength is escalating for the at least one common catalog resource;
in the event it is determined, in the first lock schedule and in the second lock schedule, at least one common catalog resource has an escalating lock strength, outputting a last location, associated with the common catalog resource with escalating lock strength, in the first lock schedule and in the second lock schedule as a potential lock escalation type of deadlock; and
in the event it is determined, in the first lock schedule and in the second lock schedule, no common catalog resource has an escalating lock strength, identifying no potential lock inversion type of deadlock.

7. The method of claim 3, wherein said creating a blocking lock comprises:
selecting one of the catalog resources associated with the lock inversion type of deadlock;
suggesting a new first entry in the first lock schedule and in the second lock schedule which includes an exclusive lock on the selected catalog resource;
determining if the suggestion is accepted; and
in the event it is determined the suggestion is accepted:
adding, to the first lock schedule and to the second lock schedule, the new first entry; and
deleting, from the first lock schedule and from the second lock schedule, one or more old entries associated with the lock inversion type of deadlock and the selected catalog resource.

8. The method of claim 5, wherein said creating a blocking lock comprises:
suggesting a new first entry in the first lock schedule and in the second lock schedule which includes an exclusive lock on the catalog resource associated with the lock escalation type of deadlock;
determining if the suggestion is accepted; and in the event it is determined the suggestion is accepted:
adding, to the first lock schedule and to the second lock schedule, the new first entry; and
deleting, from the first lock schedule and from the second lock schedule, one or more old entries associated with the lock escalation type of deadlock.

9. A system for testing catalog access statements in a code base prior to run time to identify and avoid a potential deadlock comprising:
a processor; and
a memory coupled with the processor, wherein the memory is configured to provide the processor with instructions which when executed cause the processor to:
obtain from the code base prior to run time a first catalog access statement and a second catalog access statement;
obtain from the code base prior to run time, for the first catalog access statement, a first lock schedule which indicates: (1) a first catalog resource that is locked by the first catalog access statement and (2) a lock strength used by the first catalog access statement to lock the first catalog resource;
obtain, for the second catalog access statement, a second lock schedule which indicates: (1) a second catalog resource that is locked by the second catalog access statement and (2) a lock strength used by the second catalog access statement to lock the second catalog resource;
said first and second lock schedules comprising respective first and second sequences of catalog access statement entries having locations in said sequences corresponding to the order in which locks are obtained on the catalog resources;
identify a potential deadlock between the first catalog access statement and the second catalog access statement by
determining if the first and the second catalog resources in the first lock schedule and in the second lock schedule are the same type of catalog resource and if the lock strengths of their corresponding locks create a potential deadlock, and
upon determining that there is a potential deadlock, avoiding the potential deadlock by creating a blocking lock at or before a location of the potential deadlock in the first and second lock schedules.

10. The system of claim 9, wherein said catalog resources comprise either a resource that stores information associated with a table, an index or a view, or a resource that stores information about functions or procedures, or a resource that stores information about a data type.

11. The system of claim 9, wherein the identified potential deadlock includes a lock inversion type of deadlock.

12. The system of claim 11, wherein the instructions for identifying the potential deadlock include instructions for:
comparing the first lock schedule and the second lock schedule;
determining if there are at least two catalog resources in common in the first lock schedule and in the second lock schedule;
determining if the at least two common catalog resources have at least partially exclusive lock strengths;
determining if the locks of the at least two common catalog resources with at least partially exclusive lock strengths are acquired in opposite order;

in the event it is determined there are at least two common catalog resources with at least partially exclusive lock strengths and locks acquired in opposite order, outputting a last location, associated with the common catalog resources with at least partially exclusive lock strengths acquired in opposite order, in the first lock schedule and in the second lock schedule as a potential lock inversion type of deadlock; and in the event it is determined there is one or fewer common catalog resources with at least partially exclusive lock strengths acquired in opposite order, identifying no potential lock inversion type deadlock.

13. The system of claim 9, wherein the identified potential deadlock includes a lock escalation type of deadlock.

14. The system of claim 13, wherein the instructions for identifying the potential deadlock include instructions for:

comparing the first lock schedule and the second lock schedule;

determining if there is at least one catalog resource in common to the first lock schedule and the second lock schedule;

determining if, in the first lock schedule and in the second lock schedule, a lock strength is escalating for the at least one common catalog resource;

in the event it is determined, in the first lock schedule and in the second lock schedule, at least one common catalog resource has an escalating lock strength, outputting a last location, associated with the common catalog resource with escalating lock strength, in the first lock schedule and in the second lock schedule as a potential lock escalation type of deadlock; and in the event it is determined, in the first lock schedule and in the second lock schedule, no common catalog resource has an escalating lock strength, identifying no potential lock inversion type of deadlock.

15. The system of claim 11, wherein creating said blocking lock comprises configuring the memory with instructions which when executed cause the processor to:

select one of the catalog resources associated with the lock inversion type of deadlock;

suggest a new first entry in the first lock schedule and in the second lock schedule which includes an exclusive lock on the selected catalog resource;

determine if the suggestion is accepted; and in the event it is determined the suggestion is accepted:
 add, to the first lock schedule and to the second lock schedule, the new first entry; and
 delete, from the first lock schedule and from the second lock schedule, one or more old entries associated with the lock inversion type of deadlock and the selected catalog resource.

16. The system of claim 13, wherein creating said blocking lock comprises configuring the memory with instructions which when executed cause the processor to:

suggest a new first entry in the first lock schedule and in the second lock schedule which includes an exclusive lock on the catalog resource associated with the lock escalation type of deadlock;

determine if the suggestion is accepted; and in the event it is determined the suggestion is accepted:
 add, to the first lock schedule and to the second lock schedule, the new first entry; and
 delete, from the first lock schedule and from the second lock schedule, one or more old entries associated with the lock escalation type of deadlock.

17. A computer program product for testing catalog access statements in a code base prior to run time to identify and avoid a potential deadlock, the computer program product being embodied in a non-transitory computer readable storage medium and comprising computer instructions for:

obtaining from the code base prior to run time a first catalog access statement and a second catalog access statement;

obtaining from the code base prior to run time, for the first catalog access statement, a first lock schedule which indicates: (1) a first catalog resource that is locked by the first catalog access statement and (2) a lock strength used by the first catalog access statement to lock the first catalog resource;

obtaining from the code base prior to run time, for the second catalog access statement, a second lock schedule which indicates: (1) a second catalog resource that is locked by the second catalog access statement and (2) a lock strength used by the second catalog access statement to lock the second catalog resource;

said first and second lock schedules comprising respective first and second sequences of catalog access statement entries having locations in said sequences corresponding to the order in which locks are obtained on the catalog resources;

identifying the potential deadlock between the first catalog access statement and the second catalog access statement by
 determining if the first and the second catalog resources in the first lock schedule and in the second lock schedule are the same type of catalog resource and if the lock strengths of their corresponding locks create a potential deadlock, and
 upon determining that there is a potential deadlock, avoiding the potential deadlock by creating a blocking lock at or before a location of the potential deadlock in the first and second lock schedules.

18. The computer program product of claim 17, wherein said catalog resources comprise either a resource that stores information associated with a table, an index or a view, or a resource that stores information about functions or procedures, or a resource that stores information about a data type.

19. The computer program product of claim 17, wherein the identified potential deadlock includes a lock inversion type of deadlock.

20. The computer program product of claim 19, wherein the computer instructions for identifying the potential deadlock include computer instructions for:

comparing the first lock schedule and the second lock schedule;

determining if there are at least two catalog resources in common in the first lock schedule and in the second lock schedule;

determining if the at least two common catalog resources have at least partially exclusive lock strengths;

determining if the locks of the at least two common catalog resources with at least partially exclusive lock strengths are acquired in opposite order;

in the event it is determined there are at least two common catalog resources with at least partially exclusive lock strengths and locks acquired in opposite order, outputting a last location, associated with the common catalog resources with at least partially exclusive lock strengths acquired in opposite order, in the first lock schedule and in the second lock schedule as a potential lock inversion type of deadlock; and in the event it is determined there is one or fewer common catalog resources with at least partially exclusive lock strengths acquired in opposite order, identifying no potential lock inversion type deadlock.

21. The computer program product of claim 17, wherein the identified potential deadlock includes a lock escalation type of deadlock.

22. The computer program product of claim 21, wherein the computer instructions for identifying the potential deadlock include computer instructions for:
   comparing the first lock schedule and the second lock schedule;
   determining if there is at least one catalog resource in common to the first lock schedule and the second lock schedule;
   determining if, in the first lock schedule and in the second lock schedule, a lock strength is escalating for the at least one common catalog resource;
   in the event it is determined, in the first lock schedule and in the second lock schedule, at least one common catalog resource has an escalating lock strength, outputting a last location, associated with the common catalog resource with escalating lock strength, in the first lock schedule and in the second lock schedule as a potential lock escalation type of deadlock; and
   in the event it is determined, in the first lock schedule and in the second lock schedule, no common catalog resource has an escalating lock strength, identifying no potential lock inversion type of deadlock.

23. The computer program product of claim 21, wherein said instructions for creating a blocking lock comprise computer instructions for:
   selecting one of the catalog resources associated with the lock inversion type of deadlock;
   suggesting a new first entry in the first lock schedule and in the second lock schedule which includes an exclusive lock on the selected catalog resource;
   determining if the suggestion is accepted; and
   in the event it is determined the suggestion is accepted:
      adding, to the first lock schedule and to the second lock schedule, the new first entry; and
      deleting, from the first lock schedule and from the second lock schedule, one or more old entries associated with the lock inversion type of deadlock and the selected catalog resource.

24. The computer program product of claim 21 wherein said instructions for creating a blocking lock comprise computer instructions for:
   suggesting a new first entry in the first lock schedule and in the second lock schedule which includes an exclusive lock on the catalog resource associated with the lock escalation type of deadlock;
   determining if the suggestion is accepted; and
   in the event it is determined the suggestion is accepted:
      adding to the first lock schedule and to the second lock schedule, and
      deleting, from the first lock schedule and from the second lock schedule, one or more old entries associated with the lock escalation type of deadlock.

* * * * *